United States Patent [19]
Verbauwhede

[11] Patent Number: 6,029,187
[45] Date of Patent: *Feb. 22, 2000

[54] FAST REGULAR MULTIPLIER ARCHITECTURE

[75] Inventor: Ingrid Verbauwhede, Berkeley, Calif.

[73] Assignee: Atmel Corporation, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,245

[22] Filed: Oct. 28, 1997

[51] Int. Cl.[7] ........................................ G06F 7/52
[52] U.S. Cl. ............................. 708/625; 708/630
[58] Field of Search ................ 364/754.01, 757, 364/758, 759, 760.01, 760.02, 760.03, 760.04, 786.03, 786.04; 708/620, 625, 626, 227, 228, 729, 730, 731, 708, 709

[56] References Cited

U.S. PATENT DOCUMENTS

| | | | |
|---|---|---|---|
| 3,866,030 | 2/1975 | Baugh et al. | 235/164 |
| 4,575,812 | 3/1986 | Kloker et al. | 364/760 |
| 4,901,270 | 2/1990 | Galbi et al. | 364/786 |
| 5,181,185 | 1/1993 | Han et al. | 364/760 |
| 5,265,043 | 11/1993 | Naini et al. | 364/757 |
| 5,343,417 | 8/1994 | Flora | 364/758 |
| 5,347,482 | 9/1994 | Williams | 364/757 |
| 5,497,342 | 3/1996 | Mou et al. | 364/786 |
| 5,504,915 | 4/1996 | Rarick | 395/800 |
| 5,586,071 | 12/1996 | Flora | 364/758 |

OTHER PUBLICATIONS

G. Goto et al., "A 54 × 54–b Regularly Structured Tree Multiplier", *IEEE Journal of Solid–State Circuits*, vol. 7, No. 9, Sep. 1992, pp. 1229–1235.

G.J. Hekstra et al., "A Fast Parallel Multiplier Architecture", *Proceedings of IEEE Symposium on Circuits and Systems*, pp. 2128–2131, 1992.

T. Sakuta et al., "Delay Balanced Multipliers for Low Power/Low Voltage DSP Core", *IEEE Symposium on Low Power Electronics: Digest of Technical Papers*, pp. 36–37, Oct. 1995.

*Primary Examiner*—Chuong Dinh Ngo
*Attorney, Agent, or Firm*—Thomas Schneck; Mark Protsik

[57] ABSTRACT

A multiplier architecture in accordance with the present invention provides increased operating speed, and yet maintains regularity in its structure in order to achieve a small floor plan when reduced to silicon. A Hekstra-type multiplier is modified by replacing full adders circuits with compressor circuits in a manner that preserves the balance of the signal propagation delays. The result is an architecture having a regular layout that greatly facilitates its implementation in silicon.

17 Claims, 7 Drawing Sheets

[unsigned]

$$a_{m-1} \quad a_{m-2} \quad \cdots \quad b_{n-1} \quad \cdots \quad a_2 \quad a_1 \quad a_0$$
$$\times \qquad\qquad\qquad\qquad\qquad\qquad b_2 \quad b_1 \quad b_0$$

$$a_{m-1}b_0 \mid a_{m-2}b_0 \quad \cdots \quad \cdots \quad a_2b_0 \mid a_1b_0 \mid a_0b_0$$
$$a_{m-1}b_1 \mid a_{m-2}b_1 \quad \cdots \quad \cdots \quad a_1b_1 \mid a_0b_1$$
$$a_{m-1}b_2 \mid a_{m-2}b_2 \quad \cdots \quad \cdots \quad a_0b_2$$
$$\vdots \qquad\qquad \ddots$$
$$a_{m-1}b_{n-2} \mid a_{m-2}b_{n-2} \quad \cdots \quad a_1b_{n-2} \mid a_0b_{n-2}$$
$$+ \quad a_{m-1}b_{n-1} \mid a_{m-2}b_{n-1} \quad \cdots \quad a_1b_{n-1} \mid a_0b_{n-1}$$

$$P_{m+n-1} \mid P_{m+n-2} \mid P_{m+n-3} \quad \cdots \quad P_{m-1} \quad \cdots \quad P_{n-1} \quad \cdots \quad P_2 \quad P_1 \quad P_0$$

FIG. 6

FAST REGULAR MULTIPLIER ARCHITECTURE

TECHNICAL FIELD

The present invention relates to electrical digital circuits for performing binary multiplication by sum of cross products, i.e. parallel multipliers, and in particular relates to the architecture of such a multiplication circuit's arrangement of adders for summing the partial products. Architectures optimized for minimum circuit area and/or maximum operating speed are especially relevant. Multipliers with balanced signal propagation delays for minimizing spurious transitions are also relevant.

BACKGROUND ART

A multiplication circuit or multiplier consists mainly of three parts: (1) a partial product generator made up of a matrix of AND logic gates, each operating on one bit of a multiplicand and one bit of a multiplier (here, the number, as opposed to the circuit), (2) a multiplier array (also called an adder array) made up of columns of adders which reduce the partial products by summation to two words, usually called the "sum" word and the "carry" word, and (3) a vector merging adder for adding the sum and carry words to result in one output word, the product. When multiplying two binary numbers, an M-bit multiplicand and an N-bit multiplier, M×N partial product terms are usually generated (although there may be some additional terms to handle negative numbers), which could alternately be thought of as N M-bit partial products, and the resulting product generally has M+N bits. In most multiplication circuits, both multiplicand and multiplier are of the same N-bit size, and the product is therefore 2N bits wide.

Multiplication circuits, when used in digital signal processors, are combined with an accumulator, so that digital filtering and other signal processing functions can be readily performed. The basic operation is ACC:=ACC+(A*B), or ACC:=ACC−(A*B). That is, typically the accumulator will add or subtract the result of the multiplication to the previous accumulated value. The accumulator is typically P bits wide, where P>2N, 2N bits is the width of the multiplier product, and the leftmost (most significant) P-2N bits, called guard bits, are there to prevent overflow. U.S. Pat. No. 4,575,812 to Kloker et al. describe one such multiplier/accumulator circuit. A straightforward implementation of a multiplier/accumulator circuit has the accumulator adder follow the vector merging adder of the multiplier, so that a first addition adds the sum and carry words to form the multiplication product and then follows this with a second addition of that product with the value in the accumulator. Alternatively, the accumulator could be integrated with the multiplier by adding an extra row of adders to the multiplier array and providing the two word result to the vector merging adder. Since only one final adder has to be provided, this simplifies the design effort, and will also improve speed somewhat.

Regardless of whether a multiplier alone or a combined multiplier/accumulator circuit is being considered, the critical path that determines operating speed consists of delay through the multiplier array and delay through the final adder (plus any delay through a separate accumulator adder). The multiplier is the slowest part of a digital signal processor, so any improvement in the speed of the multiplier will improve the overall speed of the processor. High speed processing is required, for example, for implementing sophisticated speech and channel coding algorithms for digital cellular telephone communication. Another factor is layout area and regularity. A regular floorplan is easy to design and layout, whereas an irregular floorplan takes considerably more time and effort to layout. The choice of a multiplier architecture usually involves tradeoffs between area and speed. Tree multiplier architectures have a delay proportional to O(log N), whereas array multiplier architectures have a delay proportional to O(N) (where N is the word length in bits). Thus, tree architectures are faster. However, because tree multipliers require large shifts of data perpendicular to the data path, their implementation is routing intensive, requiring a larger circuit area than array multipliers. Tree architectures also tend to be very irregular in their layout.

In U.S. Pat. Nos. 5,343,417 and 5,586,071, Flora describes a Wallace tree multiplier architecture in which the columns of full adders and half adders that are used in the multiplier to reduce the partial products by successive addition to sum and carry words are chosen so that the particular inputs to be added at each adder level comply with prescribed rules that enhance the multiplier's operating speed. U.S. Pat. No. 5,181,185 to Han et al. and U.S. Pat. No. 5,504,915 to Rarick disclose other high speed parallel multipliers employing modified Wallace tree adders for summing the columns of partial products. All of these disclosed multiplication circuits illustrate the basic layout irregularity that is characteristic of tree multiplier architectures. The modified Wallace trees sacrifice some speed to obtain greater layout regularity as compared with pure Wallace tree architectures.

U.S. Pat. No. 4,901,270 to Galbi et al., and an article by G. Goto et al. in *IEEE Journal of Solid-State Circuits*, vol. 27, no. 9, September 1992, pages 1229–1234, describe use of four-to-two compressor adders in tree multipliers for further improving their speed. In U.S. Pat. No. 5,347,482, Williams discloses that using nine-to-three adders in a Wallace tree simples layout and signal routing because of the larger basic building blocks of the tree, yet operates in the same number of adder delays as a three-to-two (full) adder. In U.S. Pat. No. 5,265,043, Naini et al. disclose a Wallace tree multiplier architecture that is provided with its carry-save adders arranged in a L-fold layout or floorplan in order to improve that architecture's layout regularity and reduce the required layout area.

G. J. Hekstra et al., in "A Fast Parallel Multiplier Architecture", Proceedings of *IEEE Symposium on Circuits and Systems*, pages 2128–2131, 1992, describe a regular array architecture with a delay proportional to $O(\sqrt{N})$. Thus, it offers to an alternative to the compact and regular, but slow, array multiplier architecture and to the fast, but irregular and large circuit area, tree multiplier architectures, like the Wallace tree multiplier. The Hekstra multiplier architecture has an "array of arrays"-based structure consisting of a number of subarrays producing a series of partial sums feeding into a main array adding the partial sums to form the product. The main array stages consist of two rows of full adders in a four-to-two reductor configuration. The subarrays consist of rows of full adders together with the partial product generators. The sizes of the subarrays vary and have been carefully chosen to balance the propagation delays so that addends arrive at a main array stage simultaneously with the previous stage's partial sum. In Hekstra's implementation, this occurs when the sizes of the subarrays, i.e. the number of full adder rows, increase in steps of two from one subarray to the next.

An article by T. Sakuta et al. in *IEEE Symposium on Low Power Electronics: Digest of Technical Papers*, pages 36–37, October 1995, highlights the importance of delay balancing in order to minimize spurious transitions and thereby to minimize unnecessary power dissipation. Adders start computing at the same time without waiting for the propagation of sum and carry signals from a previous stage, so that if the addends do not arrive simultaneously at an adder, spurious transitions will result. These spurious transitions also propagate to subsequent stages, resulting in a growing number of transitions from one stage to the next. Conventional array multiplier architectures are inherently unbalanced, and thus tend to consume a lot of power. In contrast, Wallace-tree multipliers are naturally balanced due to their inherent parallel structure, and thus have a lower probability of occurrence of spurious transitions. Delay circuits could be inserted into the signal paths of any product term inputs that skip an adder ladder to synchronize them with the other inputs of corresponding adders, as taught by T. Sakuta et al. As for the aforementioned Hekstra architecture, that multiplier happens to be delay balanced only because of an appropriate selection of subarray sizes.

Although the Hekstra-type multiplier architecture is very regular in comparison with the Wallace and other tree architectures and nearly as compact as a conventional array multiplier, and is also much faster than an array multiplier, it is still somewhat slower than the tree multiplier architectures. Because of their naturally balanced parallel structure, it has been relatively easy to incorporate four-to-two, nine-to-three and other compressor adder structures into the tree multipliers without destroying its balanced signal propagation, in order to increase its operating speed. Moreover, modified tree architectures and hybrid tree-array architectures have allowed designers to improve regularity and reduce circuit area to a certain extent without sacrificing too much speed. Accordingly, where space is not at a premium, tree architectures have become the design of choice. Where small circuit area is essential, circuit designers have been forced to cope with array multipliers, despite their slow speed. The Hekstra-type multiplier is not well known and has been generally ignored. Since the one-sided architecture of adder subarrays feeding into a single main array is not inherently balanced, but rather balanced only by construction with a proper selection of subarray sizes, any modifications would require great care if balance is to be maintained.

It is an object of the present invention to provide a modified Hekstra-type multiplier architecture with improved operating speed, without sacrificing circuit area and regularity or destroying the delay balance.

DISCLOSURE OF THE INVENTION

The object has been met with a multiplier architecture of the Hekstra-type, that is, one where a plurality of adder subarrays feed into a main adder array, which has been modified by replacing pairs of full adders in the subarrays with four-to-two compressor adder circuits, hereafter referred to as compressor circuits, in a manner that preserves the balance in the signal propagation delays so that partial sums arrive at each stage of main array simultaneously. Two types of compressor circuits, referred to as symmetric and asymmetric compressors, are used in different portions of the multiplier architecture. The asymmetric compressors are used whenever not all of its inputs are available at the same time.

BRIEF DESCRIPTION OF THE DRAWINGS

FIGS. 6 and 7 are standard algebraic notations illustrating multiplication by known sum-of-cross-products algorithms of an m-bit multiplicand and an n-bit multiplier to form an (m+n)-bit product for respective unsigned and 2's complement notations. The two's complement multiplication of FIG. 7 implements the Baugh-Wooley algorithm disclosed in U.S. Pat. No. 3,866,030, and is carried out by the preferred multiplication circuitry of FIG. 5.

BEST MODE OF CARRYING OUT THE INVENTION

Figure 1:
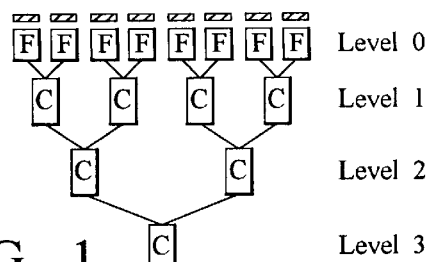
FIGS. 1 and 2 are respective diagrams of component interconnection structure and block layout of a typical prior art tree multiplier architecture.

With reference to FIGS. 1–4, a prior art tree architecture is presented side-by-side with an architecture in accord with the present invention so that their respective structures, routing and propagation delays may be compared. In FIG. 1, it can be seen that the prior art structure is a full binary tree, i.e., a Wallace tree, in which each full adder (F) in an initial level of adders (level 0) operates on a set of partial products 13, typically three per adder, to produce a partial sum. Thus, the initial level produces a set of partial sums equal to the number of full adders (F) in level 0 of the structure. The adders (F) also produce an equal number of carries that are transferred to level 1 of a similar tree structure responsible for summing partial products of the next higher significance level for the binary product. In FIG. 1, level 1 consists of a set of 4-to-2 compressor circuits such as those described by Goto et al., in *IEEE Journal of Solid-State Circuits*, vol. 27, no. 9, September 1992, pages 1229–1235. Each compressor circuit carries out the operations of two full adders in series but has a propagation delay of about 1.5 times one full adder delay. Two full adders could be used, if desired. Each compressor circuit (C) in level 1 takes four inputs from level 0, such as two partial sums output by two full adders (F) in level 0 in the same tree and two carries from equivalent level 0 full adders in the tree responsible for summing the partial products of next lower significance level of the binary product. Each level 1 compressor circuit (C) also receives another carry from the corresponding level 1 compressor in the next lower significance summing tree. The level 1 compressor circuit (C) generates a carry for the corresponding level 1 compressor in the next higher significance summing tree and a second carry for a level 2 compressor in the next higher significance summing tree. It also generates a partial sum for a level 2 compressor in the same tree as itself. Compressors in levels 2 and 3 operate in a similar manner. In this way, each tree reduces partial products of the same significance level (together with carries from the next lower significance summing tree) to a final sum and a final carry. Each successive level reduces in half the number of partial sums, so that the number of levels required (and hence the propagation delay) is on the order of log(N), where N is the number of partial products to be summed. The tree in FIG. 1 is capable of handling up to 24 partial products (8 full adders times 3 partial products per adder).

Figure 2:
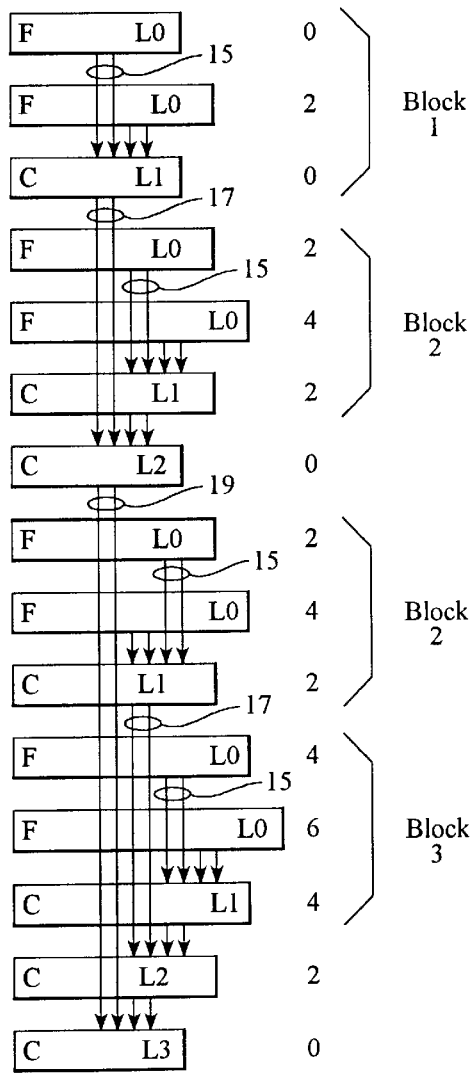

One problem with such tree structures occurs when attempting to layout such an architecture in a somewhat regular manner. Because the structure is tree-like, it is difficult to get into a rectangular shape. In FIG. 2, the tree of FIG. 1 responsible for a single bitwise significance level in the final product is arranged in a linear fashion so that adjacent trees can be arranged side-by-side to facilitate transfer of the carry signals from one bit-column tree to the next. Each block or cell in FIG. 2 represents either a full adder (F) or a compressor circuit (C). As previously mentioned, pairs of full adders could be used instead of the compressor circuits. Each cell in FIG. 2 also indicates the level to which it belongs (L0, L1, L2, L3). The transfer of partial sums to the next level is indicated by the arrows between cells. It can be seen that the tree architecture poses a serious routing problem. Only half of the connections between cells are local whereas the other half require routing through one or more intervening cells. With each extra level added to the tree hierarchy, the length of nonlocal wires doubles, so that whereas connection of level 0 cell and level 1 cells requires nonlocal wires 15 that are two cells long, some connections between levels 1 and 2 require nonlocal wires 17 that are four cells long and certain connection between levels 2 and 3 require wiring 19 which is eight cells long. Moreover, with each extra level in the hierarchy, two additional routing tracks through cells have to be provided. The numbers to the right of each cell in FIG. 2 shows the number of cell-to-cell wires that pass through that cell. Different cells have different numbers of crossing tracks for wires to pass through depending on their position in the line of cells, with the later cells tending to require more tracks. This situation requires extra layout effort, because each level in the hierarchy will require a different layout topology. The widths of the cells varies according to the number of wiring tracks they must accommodate. There are several blocks of cells that have two full adders (F) followed by one compressor circuit (C). However, blocks 1, 2 and 3 are all of different layout type, since the different blocks require different numbers of routing tracks.

Figure 3:
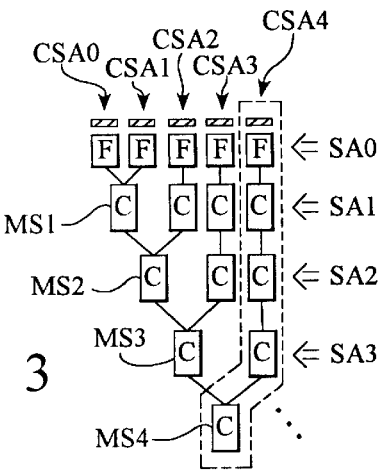
FIGS. 3 and 4 are respective diagrams of component interconnection structure and block layout of a modified Hekstra-type multiplier architecture in accord with the present invention, arranged side-by-side with FIGS. 1 and 2 for comparison.

FIG. 3 shows an architecture in accord with the present invention. This architecture has a sequence of successively longer chains (CSA0, CSA1, CSA2, CSA3, CSA4) of adders producing partial sums that feed into a series of main adder stages (MS1, MS2, MS3, MS4). The structure is a connection of carry save arrays. Two such subarrays (CSA0 and CSA1) each consist of one full adder cell for each column of partial products and supply partial sums to a first main stage adder MS1. All of the main stage adders are four-to-two compressor circuits. The output of the first main stage adder MS1 and the partial sum provided by yet another subarray CSA2 are input into a second main stage adder MS2. In order to maintain the proper delay balance, subarray CSA2 consists of a full adder cell (F) and a compressor circuit (C) so that the partial sum generated by the subarray CSA2 arrives simultaneously with that of first main stage MS1 at the second main stage adder MS2. The output of the second main stage adder MS2 and the partial sum output provided by a subarray CSA3 are input into a third main stage adder MS3. Again, to maintain proper delay balance, the subarray CSA3 consists of a full adder (F) and two compressor circuits (C) to match the propagation delay through the second main stage MS2. This sequence can continue to arbitrarily large structures, with each step in size including another main stage (e.g. MS4) and another subarray (e.g. CSA4), where for proper balance, the successive carry save arrays making up the subarrays feeding into the main stage adders increase in size by one compressor circuit per subarray. Thus, subarray CSA4 would consist of a full adder stage (F) and three compressor stages (C). Another difference necessitated by the one sided nature of the "branching" in the structure, is that the compressor circuits (C) for the main stages (MS1, MS2, MS3, MS4) be symmetric circuits, since all inputs naturally arrive simultaneously if the subarray sizes are chosen correctly, but that at least some of the compressor circuits (C) in the subarrays (CSA2, CSA3, CSA4) be asymmetric circuits, since their partial product inputs would normally arrive earlier than the partial sums output by the preceding stage of the subarrays. Additional delay circuits could be included like those mentioned in the article of T. Sakuta et al. cited previously. More detailed description of the symmetric and asymmetric compressors will be provided below with reference to FIGS. 8–11.

Figure 4:
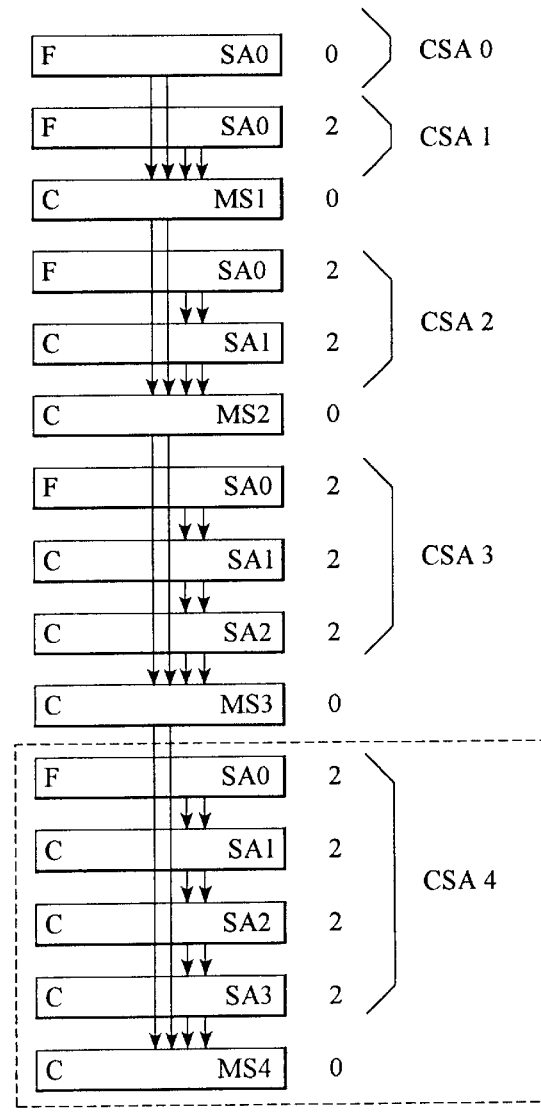

Turning now to FIG. 4, an advantage of this modified Hekstra-type structure is seen when the adder stages are laid out linearly in blocks. Unlike the tree architecture of FIG. 2, all connections are local, except the connections from one main stage to the next main stage, and from subarray CSA0 to first main stage MS1. Thus, regardless of the total size of the architecture, i.e. the number of product terms to be reduced and the number of main stages and subarrays needed to reduce them, there will never be more than two signal paths crossing through a subarray cell and all cells can be the same size to accommodate those signal paths or tracks. The layout is very regular and only a few different types of cells are needed, repeated throughout the structure, thereby simplifying design. The full adders (F) in each subarray can be identical, the main stage compressor circuits (C) can be identical, and the subarray compressor circuits (C) can be identical regardless of whether they are in subarray CSA2 or CSA3 or stage SA1 or SA2, etc.

Figure 5:
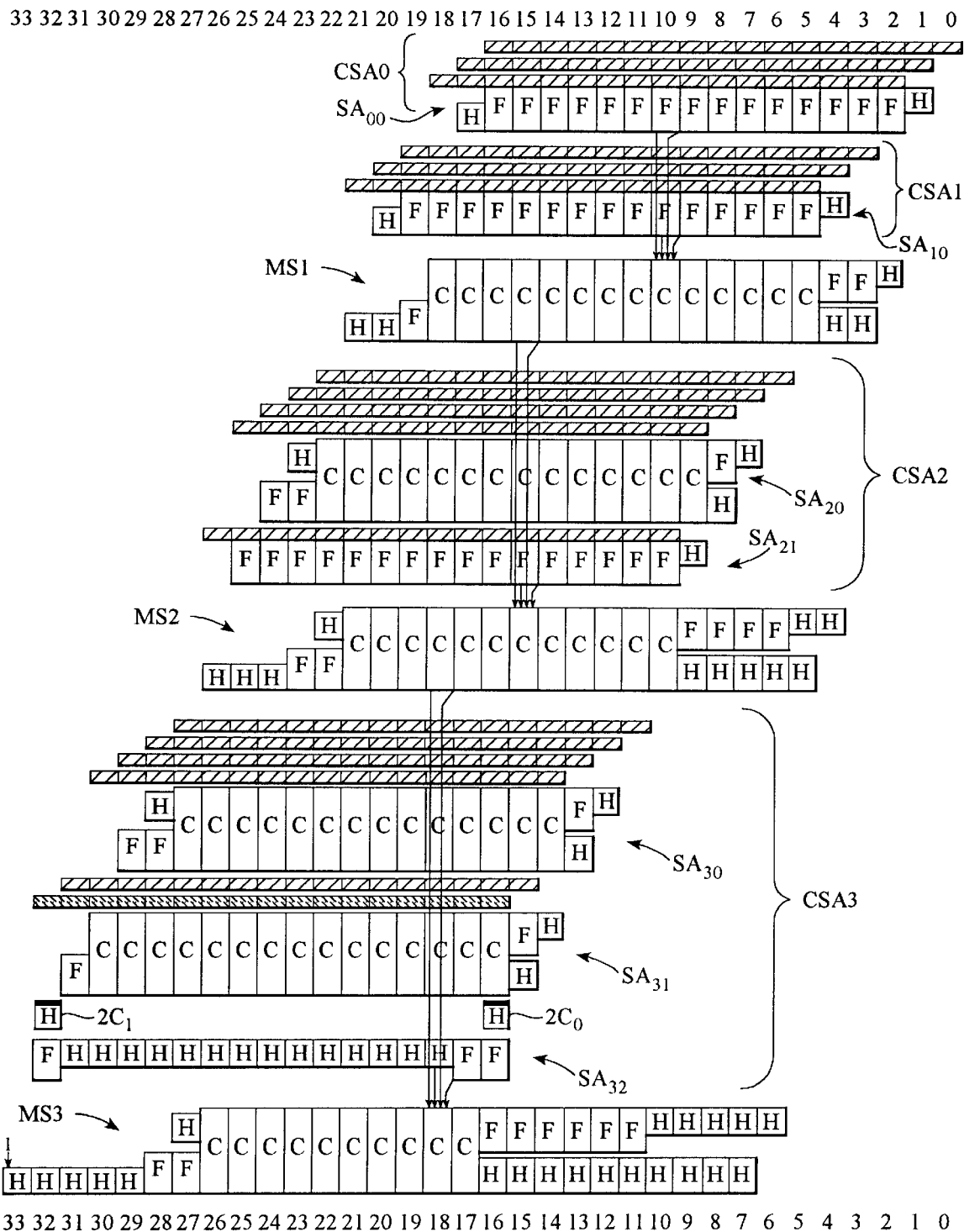
FIG. 5 is a detailed block schematic diagram of a preferred multiplier architecture of the present invention showing the components of the architecture's multiplier array reducing partial products by summation. The final vector merging adder is conventional, and is not shown.

With reference to FIG. 5, a preferred embodiment of a multiplier circuit of the present invention is adapted for carrying out 17-bit by 17-bit 2's-complement binary multiplication, using the Baugh-Wooley algorithm of U.S. Pat. No. 3,866,030, but with the improved multiplier architecture of FIGS. 3 and 4. In FIG. 5, the numbers from 0 to 33 on the top and bottom of the figure refer to the particular bit in the resulting product. The small rectangular elements with diagonal hatching refer to product term generators. The differently hatched rectangular elements immediately above subarray level $SA_{31}$ and the solid rectangular elements above half-adder cells $2C_0$ and $2C_1$ are also product terms which are peculiar to the Baugh-Wooley 2's-complement multiplication algorithm. All of the product terms are detailed below in FIG. 7. There are three basic types of adder cells used in the circuit: half-adders (H), full-adders (F), and four-to-two compressor circuits (C). Each of these adders is well known in the art. Further, the four-to-two compressor circuits (C) are of two types, asymmetric for at least the subarray stage $SA_{31}$, in FIG. 5 (which, unlike FIGS. 3 and 4, places the compressor stages $SA_{20}$, $SA_{30}$ and $SA_{31}$ ahead of the full adder stages $SA_{21}$ and $SA_{32}$ of the subarrays $CSA_2$ and $CSA_3$), and in other configurations for other subarray stages as well, and symmetric compressor circuits for at least the main array stages MS1, MS2 and MS3. Construction of these two compressor types will be discussed below with reference to FIGS. 8–11. Also, half-adders (H) could be replaced with full adders (F) in which one of the inputs is fixed at logic level zero. Likewise, a combination of a full-adder (F) followed by a half-adder (H) within a stage (or even two half-adders) could be replaced by a compressor circuit (C) in which one (or two) of the inputs is fixed at zero. In this way, even more regularity can be obtained, albeit at the expense of a slightly less optimal adder cell.

Each cell (H, F or C) generates both a sum term and a carry term. Representative connections of those terms to inputs in the main array stages MS1, MS2 and MS3 are shown by the arrows. Each cell of the main stages receives one sum term output from a previous main stage (or in the case of main array stage MS1, from subarray $SA_{00}$), one carry term output from that same previous main stage (or subarray $SA_{00}$), one sum term output from the subarray stage which is local to it, i.e. the block of adders immediately above it, and likewise a carry term from that same local subarray stage. The sum terms come from adder cells in the same bit column, while the carry terms come from adder cells of the next lower significance (i.e., immediately to the right of the cells supplying the sum terms). Thus, for example, compressor cell (C) in bit column 18 of main stage MS3 receives a sum term from the compressor C in bit column 18 of main stage MS2, a carry term from the compressor C in bit column 17 of main stage MS2, a sum term from the half-adder H in bit column 18 of subarray stage $SA_{32}$, and a carry term from the full-adder F in bit column 17 of subarray stage $SA_{32}$. In some instances, the full complement of two sum terms and two carry terms is not available (notably at the far left and far right of most stages), so a compressor cell C is not needed and a full-adder/half-adder combination, or even a half-adder/half-adder combination, is all that is required. Thus, for example, the bit column 9 location of main adder stage MS2 receives a sum and carry from main stage MS1, but only a sum term from subarray stage $SA_{21}$. No carry term from bit column 8 of stage $SA_{21}$ is generated, so a compressor cell is not required at stage MS2—column 9. As noted previously, compressors (C) could be used in those locations with appropriate fixed logic zero inputs. The connections between successive stages of the same subarray, namely stages $SA_{20}$ and $SA_{21}$ of subarray CSA2 and stages $SA_{30}$, $SA_{31}$ and $SA_{32}$ of subarray CSA3, are purely local.

Figure 7:
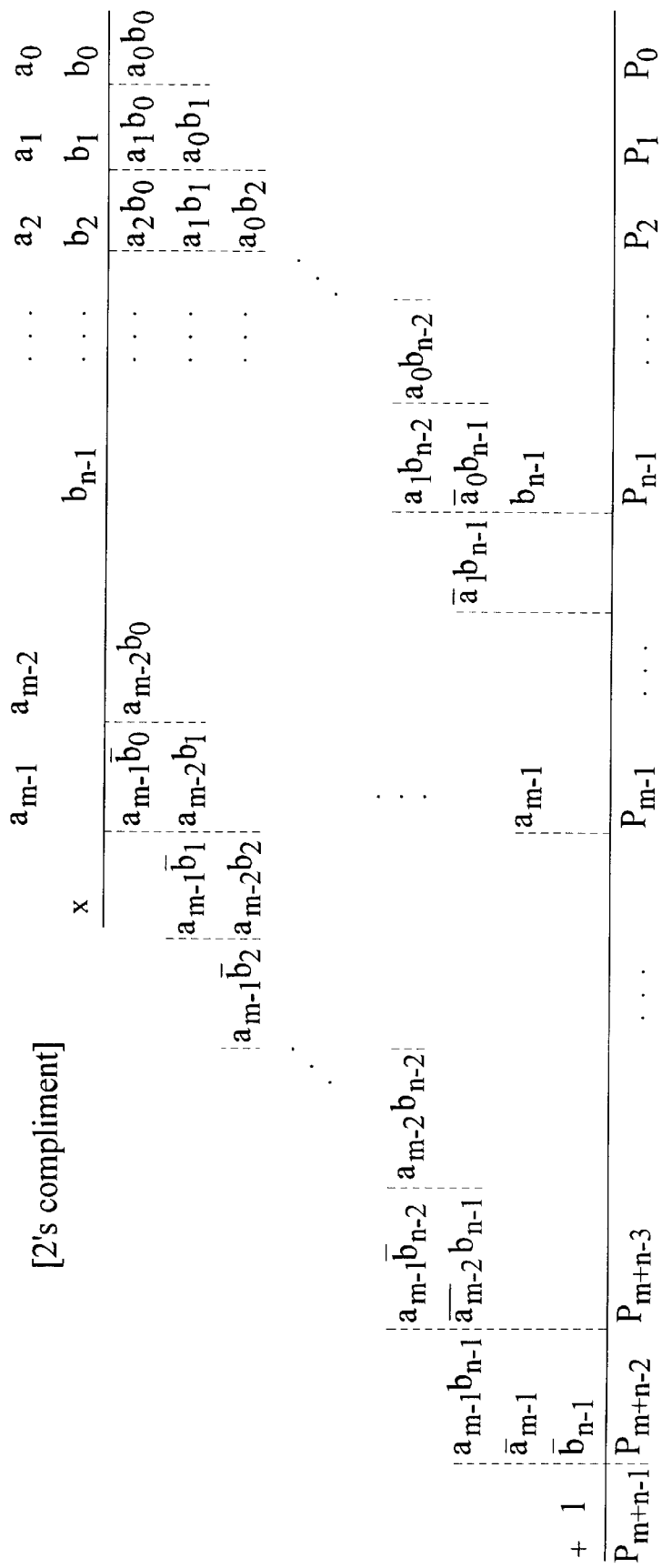

With reference to FIGS. 6 and 7, the partial products generated by the multiplier circuit depend on the particular binary number notation and multiplication algorithm to be used. The particular circuit shown in FIG. 5 performs the Baugh-Wooley 2's complement multiplication of FIG. 7. FIG. 6 shows the multiplication of two binary numbers in unsigned notation, i.e. an m-bit multiplicand [$b_{n-1} \ldots a_2 a_1 a_0$] and a n-bit multiplier [$b_{n-1} \ldots b_2 b_1 b_0$], to form an (m+n)-bit product [$P_{m+n-n}P_{m+n-3} \ldots P_2 P_1 P_0$]. The algorithm used is a straightforward sum-of-cross-products method. The bit-column of the partial products ($a_i b_j$) corresponds to the sum of the bit significances i and j, so that, for example, partial product ($a_{m-2} b_1$) has a bit-significance in the final product of (m-2)+1=(m-1) and appears in the bit-column for $P_{m-1}$ Each column of partial products of the same bit-significance is added, with carries being transferred to the column of the next higher bit-significance. In FIG. 7, the m-bit multiplicand [$a_{m-1} a_{m-2} \ldots a_2 a_1 a_0$] and n-bit multiplier [$b_{n-1} \ldots b_2 b_1 b_0$] are in 2's-complement notation. Accordingly, [$a_{m-1} a_{m-2} \ldots a_2 a_1 a_0$] represents the number $\{-(a_{m-1})2^{m-1}+(a_{m-2})2^{m-2}+ \ldots +(a_2)2^2+(a_1)2^1+(a_0)2^0\}$, and likewise [$b_{n-1} \ldots b_2 b_1 b_0$] represents the number $\{-(b_{n-1})2^{n-1}+ \ldots +(b_2)2^2+(b_1)2^1+(b_0)2^0\}$. Note the subtraction in the most significant bit position. The Baugh-Wooley algorithm generates cross-products in which the most significant bit (MSB) partial product of every row except the last row has one input from the multiplier inverted ($\overline{b}_0, \overline{b}_1, \overline{b}_2, \ldots, \overline{b}_{n-2}$), the partial products of the last row, except for the MSB partial product, have one input from the multiplicand inverted ($\overline{a}_0, \overline{a}_1, \overline{a}_2, \ldots, \overline{a}_{m-2}$), and extra terms $a_{m-1}, b_{n-1}, \overline{a}_{m-1}, \overline{b}n-1$ and 1 are added at bit positions m-1, n-1, m+n-2, m+n-2, and m+n-1, respectively. In practice, however, a "1" is not actually added to bit position m+n-2. Instead the carry out of half-adder $2C_1$ is inverted and fed into half-adder H in bit position 33 of main stage MS3. The carry out of half-adder $2C_1$ also is connected to bit position 34 of the sum output of main stage MS3. This implementation detail avoids having to provide a constant value in the architecture. Again, the columns of partial products having the same bit-significance are added, with carries transferred to the column of the next higher bit-significance. The result is a product which is also in 2's-complement notation. In FIG. 5, since m=n=17, the added terms are provided to the half-adders $2C_0$ and $2C_1$ in bit-columns 16 and 32 and to the half-adder (H) of main stage MS3 in bit column 33.

Not shown in FIG. 3 is the final addition by a vector merging adder of the sum and carry words generated by the structure shown. This vector merging adder is essentially identical to any of those found in the prior art. Several alternatives are possible: carry ripple, carry look-ahead, carry select, etc. Also not shown is any additional row of adders, either prior to or after the vector merging adder, for adding the accumulator bit values in an integrated multiplier-accumulator circuit. Again, this is like that found in the prior art. Finally, with respect to FIGS. 1–4 it is noted that structure does not have to start with a row of full adders. Whether full adders are used depends on the size of the multiplier circuit at hand. For example, the embodiment of the present invention shown in FIG. 5 shows a 17×17 multiplier, and so requires an initial row of full adders as reflected in FIGS. 3 and 4.

With reference to FIGS. 8–11, various possible four-to-two compressor circuits are shown. These replace pairs of successive full-adders, but have a delay of only about 1.5 full adders. This reduction in delays improves operating speed, but necessitates extreme care when attempting to construct a balanced multiplier structure. These compressor circuits are also known as five-to-three compressors, since there are two additional carry terms $C_{in}$ and $C_{out}$. However, since these additional carry terms normally connect adjacent cells in the same row or stage and are generally not received from a previous stage or carried to a succeeding stage, they are not always counted, hence the usual designation of four-to-two compressor.

Figure 8:
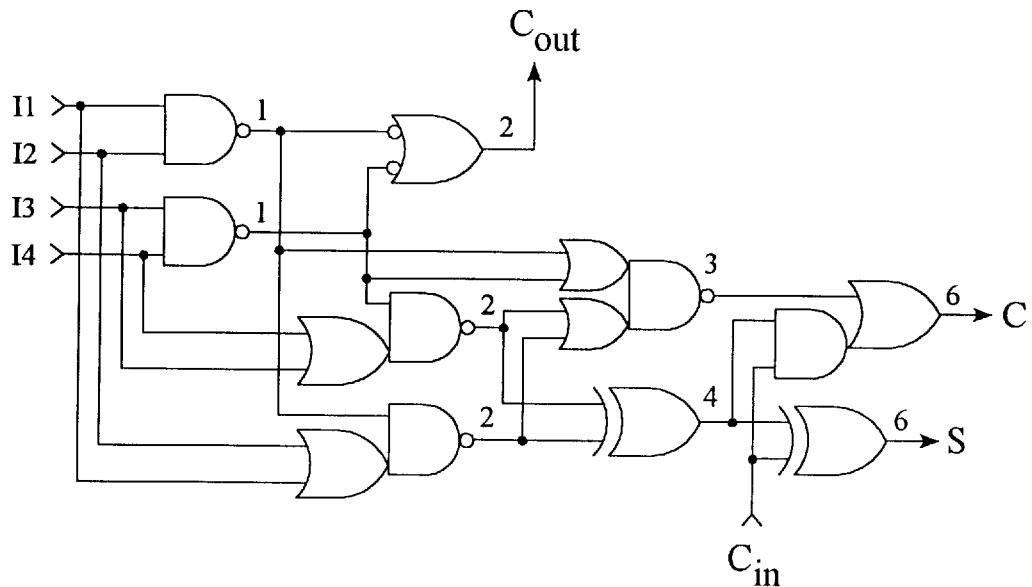
FIGS. 8–11 are logic gate-level circuit diagrams of four-to-two compressor circuits for use in the multiplication circuitry of FIG. 5.

The compressor circuit in FIG. 8 is that taught by G. Goto et al. in *IEEE Journal of Solid-State Circuits*, vol. 27, no. 9, pages 1229–1235, September 1992. This is a symmetric compressor circuit designed for when all four inputs I1–I4 arrive substantially at the same time. The logic carried out by the compressor is:

$$C_{out} = I1 * I2 * I3 * I4;$$

$$C = \sim\{[\sim(I1 \wedge I2) + \sim(I3 \wedge I4)] * [\sim(I1 * I2) + \sim(I3 * I4)] + \{C_{in} * (I1 \wedge I2 \wedge I3 \wedge I4)\};$$

$$S = [(I1 \wedge I2) \wedge (I3 \wedge I4)] \wedge C_{in};$$

where ~, +, ^, and * represent the logical operations NOT, OR, XOR, and AND, respectively. In order to compare the different circuits, we assume unit delays, with delays of 1 unit for an inverting gate, 2 units for a noninverting gate and 2 units for an XOR or NXOR gate. The numbers in the figure represent the delays at the output of each gate. To generate $C_{out}$ takes 2 unit delays. $C_{out}$ is supplied to $C_{in}$ an adjacent cell of next higher order bit-significance in the same stage. To generate both the sum term S and the carry term C takes 6 unit delays.

Figure 9:
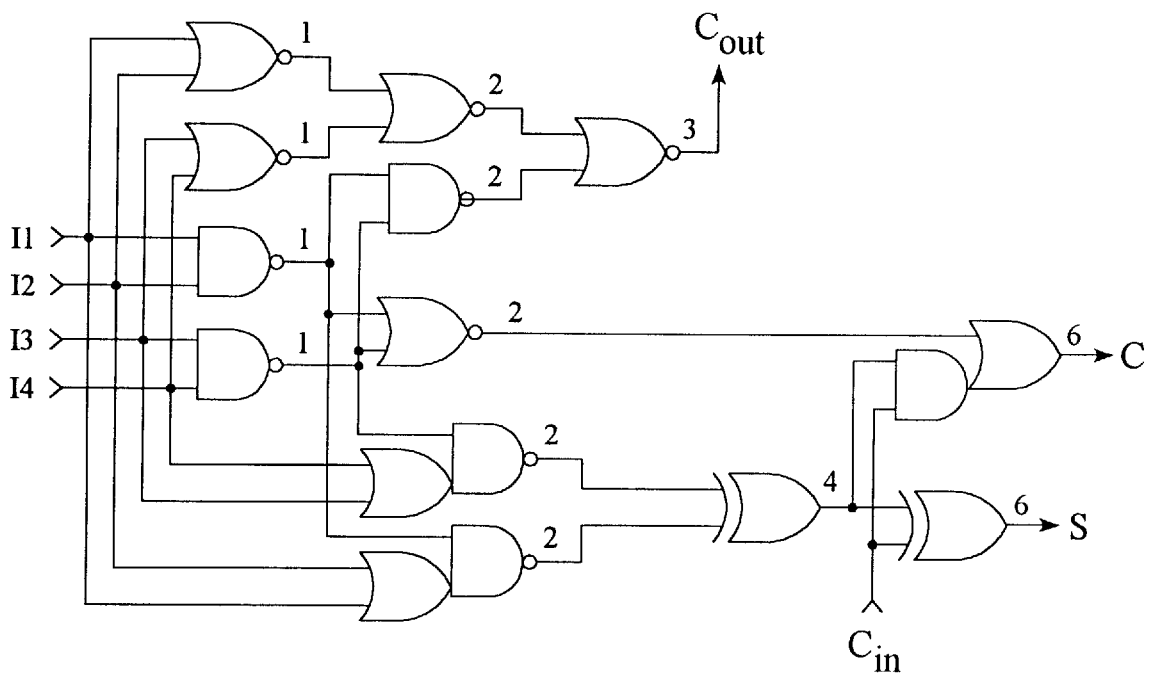
Figure 10:
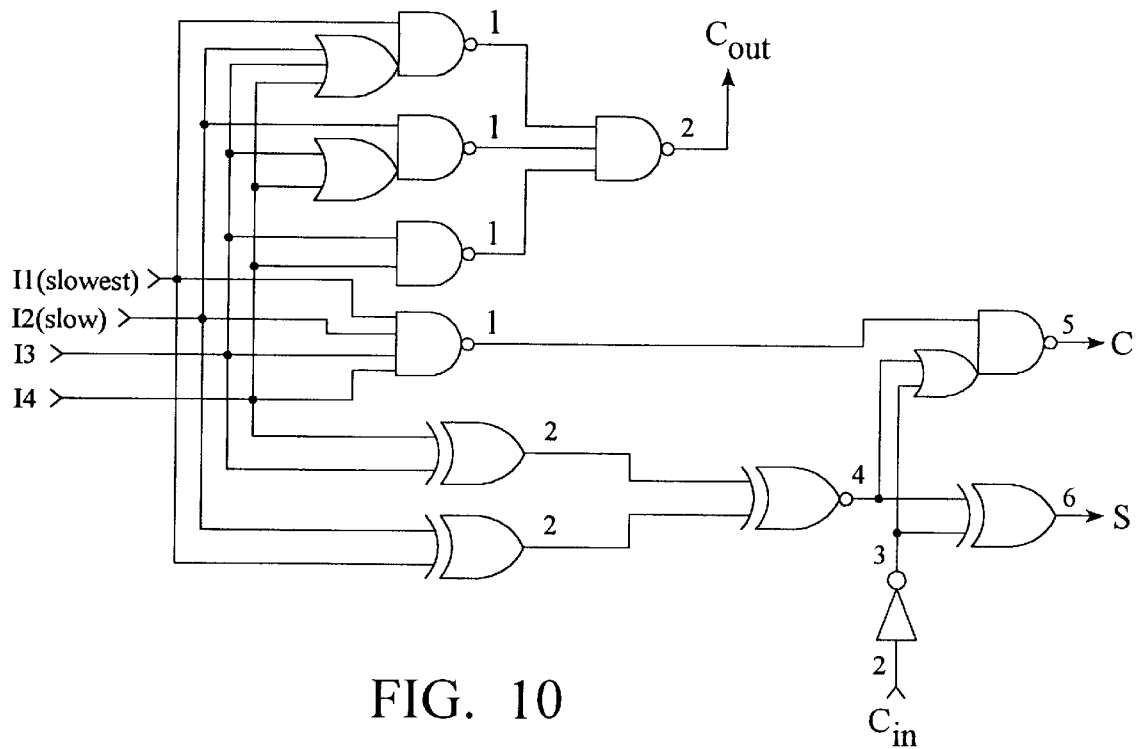
Figure 11:
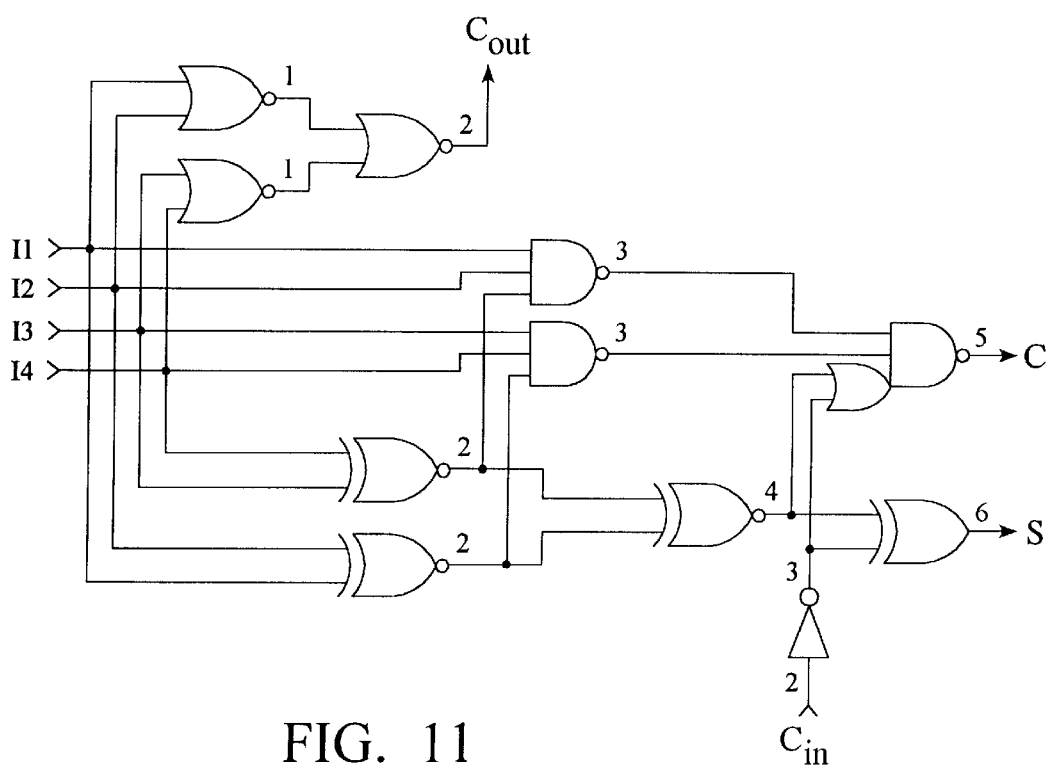

The circuits in FIGS. 9–11 are completely new. Several rules have been followed in devising those circuits. The coding for the sum output S is unique. S will always be the parity of the five input bits I1–I4 and $C_{in}$. Specifically, if the number of 1's in the five input bits is odd, S will be 1; S will be 0 otherwise. The coding for the carry outputs $C_{out}$ and C is not unique, providing flexibility in design. These carry outputs represent the presence of two or more 1s in the input pattern. If there are two or three 1s at the inputs, there will be one and only one 1 in the carry outputs (either C or $C_{out}$) and the other carry output will be a zero. Any combination that follows this rule is a valid combination that will result in correct operation of the compressor. Another rule, which is followed for optimization of the circuit, is to make $C_{out}$ independent of $C_{in}$. Therefore the bit assignment for $C_{out}$ should be the same for $C_{in}$ equal to either 0 or 1. This is for speed reasons, to avoid rippling through the bit positions, because $C_{in}$ comes from the bit position of next lower significance and at the same level in the hierarchy. The compressor of FIG. 8 is just one particular example of these rules.

In FIGS. 9 and 10, the compressor logic is:

$$C_{out} = [(I1 + I2) * (I3 + I4)] + (I1 * I2) + (I3 * I4);$$

$$C = (I1 * I2 * I3 * I4) + (C_{in} * (I1 \wedge I2 \wedge I3 \wedge I4)];$$

$$S = [(I1 \wedge I2) \wedge (I3 \wedge I4)] \wedge C_{in}.$$

In the FIG. 9 implementation of this logic, generating $C_{out}$ takes 2 unit delays, while generating the sum and carry terms S and C both take 6 unit delays. There are equal delays from the inputs I1–I4 to the primary outputs S and C. In other words, like the compressor of FIG. 8, the circuit in FIG. 9 is also symmetric.

The compressor in FIG. 10 is an asymmetric version. This version has shorter delay from input I1, and secondly from input I2, then from inputs I3 and I4, to generate $C_{out}$ (and hence also C ends which depend on $C_{in}$ from $C_{out}$ of a similar adjacent circuit). Also, the carry output C is slightly faster than the sum output S, by 1 unit delay (5 versus 6 units). This asymmetric version is preferred when not all inputs are available at the same time. Thus the slowest arriving signals can be provided on the shorter delay inputs I1 and I2, while the sooner arriving signals can be provided to the longer delay inputs 13 and 14. In FIG. 5, this asymmetric compressor could be used for subarray stage $SA_{31}$ in which the product terms are generated before the arrival of partial sums from stage $SA_{30}$. In the structure of FIGS. 3 and 4 in which full adder stages SA0 are put first, all of the compressor stages SA1, SA2 and SA3 of the sub-arrays CSA2, CSA3, CSA4 would preferably be asymmetric. Other asymmetric circuits could be synthesized, depending on the logic cells available to the designer.

In FIG. 11, the compressor circuit implements the following logic:

$$C_{out} = (I1 + I2) * (I3 + I4);$$

$$C = [(I1 * I2) + \sim (I3 \wedge I4)] + [\sim (I1 \wedge I2) * (I3 * I4)] + (C_{in} * (I1 \wedge I2 \wedge I3 \wedge I4));$$

$$S = [(I1 \wedge I2) \wedge (I3 \wedge I4)] \wedge C_{in}.$$

Like the compressors in FIGS. 8 and 9, it is symmetric with respect to the inputs I1–I4. However, like FIG. 10 it provides the carry output C slightly faster than the sum output S by 1 unit delay (5 versus 6 units).

The following table summarizes the advantages of the present invention relative to the prior art by way of comparison. Note that delays are expressed as Full Adder delays (FA).

| Architecture | Layout | Propagation Paths | Delay Scaling | 17 × 17 Delay |
|---|---|---|---|---|
| Carry Size Array | Regular | Unbalanced (Ripple) | O(N) | 15 FA |
| Tree | Irregular | Inherently Balanced | O(log N) | 6 FA |
| Tree with Compressors | Irregular | Inherently Balanced | O(log N) | 4.5 FA |
| Hekstra | Regular | Balanced by Construction | O(√N) | 7 FA |
| The Invention | Regular | Balanced by Construction | O(√N) | 5.5 FA |

The invention has the advantage of being both regular in its layout and relatively fast in its operation (5.5 full adder delays), thus combining beneficial properties of both array architectures and tree architectures. Another advantage is that except for the connections between its main array stages, all connections are local, so that only two signal tracks need be provided in the layout no matter how large it is scaled. This is one aspect of its regularity and hence its small circuit area. By contrast, tree architectures require more and more routing tracks as they scaled to larger sizes.

While the present invention, like the Hekstra architecture, has balanced delays in its propagation paths, they are not inherently balanced like tree architectures but only balanced by construction with a proper choice of subarray sizes. Accordingly, when the compressor circuits of FIGS. 8–11 are incorporated into the architecture of the present invention, special care has been required to ensure that balance is maintained. In particular, each signal path through any of the subarrays and through the main array has been constructed so that it presents the same number of compressor circuits as all other signal paths. Each successive subarray feeding into a successive stage of the main adder array has one additional compressor than the previous subarray. One full adder can (optionally) be present in each subarray path, as it is in FIGS. 3–5. If the full adder heads a subarray, then any compressors in the remainder of that subarray should be of the asymmetric type. If the full adder is the last element of the subarray prior to feeding into the main array, then the first compressor circuit can be of the symmetric type. All of the main array compressors are of the symmetric type. With this careful construction, spurious transactions can be minimized. (Additional delay elements could be added where needed to handle residual imbalance, as taught by T. Sakuta et al. in the article referred to previously.)

Figure 12:
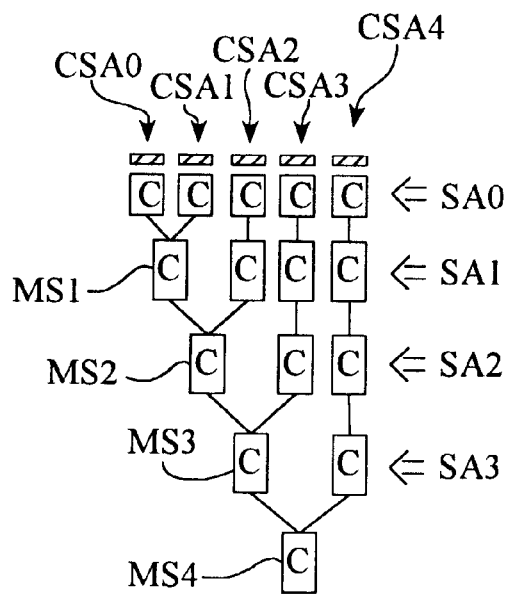
FIGS. 12 and 13 are diagrams of component interconnection structure for two alternate modified Hekstra-type multiplier architectures in accord with the present invention.
Figure 13:
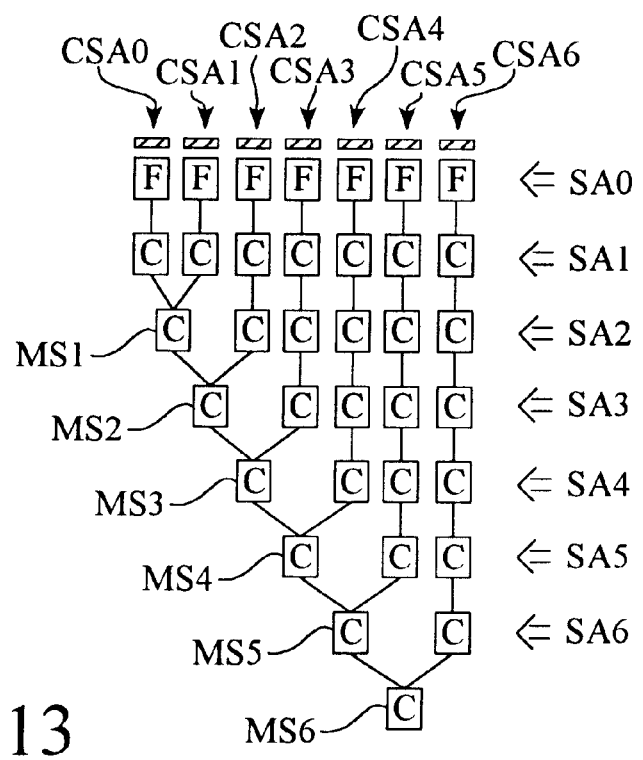

Also, the architecture of the present invention can be scaled by increasing the number of main array stages and corresponding subarrays. A 32×32 multiplier, for example, can be implemented with four main adder stages and no full adder stages in the subarrays (i.e. only compressors). It has a propagation delay of only 7.5 full adders. A 61×61 multiplier can be implemented with six main adder stages and a delay of only 11.5 full adders (still faster than a 17×17 array architecture) where the subarrays CSA0 and CSA1 consist of a full adder followed by a compressor, and each successive subarray adds one additional compressor. These constructions are illustrated in FIGS. 12 and 13, respectively, in the same manner as FIG. 3. As a final note, it is observed that the structure of FIG. 13 can be easily modified to realize a 58×58 multiplier. This is accomplished by removing the row of full adders F. The resulting 58×58 multiplier has a delay of 10.5 full adders.

I claim:

1. A multiplication circuit, comprising:

means, receiving an M-bit multiplicand and an N-bit multiplier, for forming N M-bit partial products, where M and N are integers greater than 8, each bit of each partial product having a bit-significance corresponding to a specified bit of an (M+N)-bit product; and addition means for summing said N M-bit partial products such that bits of said partial products having the same bit-significance are added together, wherein said addition means is organized into an architecture that is characterized by a plurality of subarrays forming partial sums and a multistage main array adding said partial sums, said architecture having an asymmetric but non-inherently delay-balanced branching architecture in which a first main array stage receives partial sums from two subarrays and each subsequent main array stage receives partial sums from one previous main array stage and only one corresponding subarray, the subarray for each subsequent main array stage being successively larger than subarrays for previous main array stages to maintain balanced propagation delays for partial sums provided to each main array stage, at least one subarray including a four-to-two compressor circuit therein, each signal propagation path from a first stage of a subarray through subsequent stages of said subarray to a stage of said main array and through subsequent stages of said main array having an identical number of compressor circuits compared to all other signal propagation paths, and each compressor circuit having four signal inputs connected to outputs from a previous stage and an extra carry input connected to a carry output from a same stage of next lower bit significance, and also having sum and carry signal outputs connected to signal inputs of a subsequent stage and an extra carry output connected to a carry input for a same stage of next higher bit significance, wherein a state of said extra carry output is derived from states of all four of said signal inputs but not from said extra carry input and states of said sum and carry signal outputs are derived from all four of said signal inputs and said extra carry input, said extra carry input operating on a result of operation upon all four signal inputs to derive said sum and carry signal output states, said sum signal output having a state set to 1 if the number of 1's in said four signal inputs and said extra carry input is odd, said sum signal output being set to 0 otherwise, said carry signal output and said extra carry output being both set to 1 if the number of 1's in said four signal inputs and extra carry input is 4 or 5, one and only one of said carry signal output and said extra carry output being set to 1 if the number of 1's in said four signal inputs and extra carry input is 2 or 3, and said carry signal output and said extra carry output being both set to 0 if the number of 1's in said four signal inputs and extra carry input is 0 or 1;

a vector merging adder receiving a multibit sum word and a multibit carry word together representing a partial sum from a final main array stage of said addition means, said vector merging adder summing said sum word and carry word to produce said (M+N)-bit product.

2. The multiplication circuit of claim 1 wherein each cell of a subarray stage and each cell of a main array stage that receives a total of four partial product inputs and generates a sum term and a carry term comprises a compressor circuit.

3. The multiplication circuit of claim 1 wherein each cell of a subarray stage and each cell of a main array stage that receives a total of three partial product inputs and generates a sum term and a carry term comprises a full adder and a half adder in sequence.

4. The multiplication circuit of claim 1 wherein said multiplicand and multiplier are in unsigned binary notation, said means for forming partial products generating cross-products of said M-bit multiplicand with said N bits of said multiplier.

5. The multiplication circuit of claim 1 wherein said multiplicand and said multiplier are in two's-complement notation, said means for forming partial products generating cross-products in accord with Baugh-Wooley's algorithm.

6. The multiplication circuit of claim 1 wherein said addition means is laid out linearly with said first main array stage following said two subarrays from which that first main array stage receives partial sums, all stages of any subarray being grouped together, and each main array stage subsequent to said first main array stage following said stages of the subarray corresponding to said main array stage, whereby all signal propagation paths are local except paths between successive main array stages, and whereby each subarray stage requires tracks for only two crossing signal propagation paths.

7. The multiplication circuit of claim 1, wherein at least one of said compressor circuits comprises:

a first signal input, a second signal input, a third signal input, a fourth signal input, and a carry input;

a first logic gate consisting of a two-input NAND gate, said two inputs of said NAND gate connected to said first and second signal inputs;

a second logic gate consisting of a two-input NAND gate, said two inputs of said NAND gate connected to said third and fourth signal inputs;

a third logic gate consisting of a two-input OR gate, said two inputs of said OR gate being inverted inputs and connected to outputs of said first and second logic gates, said third logic gate providing a first carry output;

a fourth logic gate consisting of a two-input OR gate feeding into one input of a two-input NAND gate, a second input of said NAND gate connected to said output of said first logic gate, said two inputs of said OR gate connected to said first and second signal inputs;

a fifth logic gate consisting of a two-input OR gate feeding into one input of a two-input NAND gate, a second input of said NAND gate connected to said output of said second logic gate, said two inputs of said OR gate connected to said third and fourth signal inputs;

a sixth logic gate consisting of first and second two-input OR gates feeding into respective inputs of a two-input NAND gate, said two inputs of said first OR gate connected to said outputs of said first and second logic gates, said two inputs of said second OR gate connected to outputs of said fourth and fifth logic gates;

a seventh logic gate consisting of a two-input XOR gate, said two inputs of said XOR gate connected to said outputs of said fourth and fifth logic gates;

an eighth logic gate consisting of a two-input AND gate feeding into one input of a two-input OR gate, a second input of said OR gate connected to an output of said sixth logic gate, said two inputs of said NAND gate connected to said carry input and an output of said seventh logic gate, said eighth logic gate providing a second carry output; and a ninth logic gate consisting of a two-input XOR gate, said two inputs of said XOR gate connected to said carry input and said output of said seventh logic gate, said ninth logic gate providing a sum output.

8. The multiplication circuit of claim 1, wherein at least one of said compressor circuits comprises:

a first signal input, a second signal input, a third signal input, a fourth signal input, and a carry input;

a first logic gate consisting of a two-input NOR gate, said two inputs of said NOR gate connected to said first and second signal inputs;

a second logic gate consisting of a two-input NOR gate, said two inputs of said NOR gate connected to said third and fourth signal inputs;

a third logic gate consisting of a two-input NAND gate, said two inputs of said NAND gate connected to said first and second signal inputs;

a fourth logic gate consisting of a two-input NAND gate, said two inputs of said NAND gate connected to said third and fourth signal inputs;

a fifth logic gate consisting of a two-input NOR gate, said two inputs of said NOR gate connected to outputs of said first and second logic gates;

a sixth logic gate consisting of a two-input NAND gate, said two inputs of said NAND gate connected to outputs of said third and fourth logic gates;

a seventh logic gate consisting of a two-input NOR gate, said two inputs of said NOR gate connected to outputs of said fifth and sixth logic gates, said seventh logic gate providing a first carry output;

an eighth logic gate consisting of a two-input NOR gate, said two inputs of said NOR gate connected to outputs of said third and fourth logic gates;

a ninth logic gate consisting of a two-input OR gate feeding into one input of a two-input NAND gate, a second input of said NAND gate connected to said output of said third logic gate, said two inputs of said OR gate connected to said first and second signal inputs;

a tenth logic gate consisting of a two-input OR gate feeding into one input of a two-input NAND gate, a second input of said NAND gate connected to said output of said fourth logic gate, said two inputs of said OR gate connected to said third and fourth signal inputs;

an eleventh logic gate consisting of a two-input XOR gate, said two inputs of said XOR gate connected to outputs of said ninth and tenth logic gates;

a twelfth logic gate consisting of a two-input AND gate feeding into one input of a two-input OR gate, a second input of said OR gate connected to an output of said eighth logic gate, said two inputs of said AND gate connected to said carry input and an output of said eleventh logic gate, said twelfth logic gate providing a second carry output; and a thirteenth logic gate consisting of a two-input XOR gate, said two inputs of said XOR gate connected to said carry input and said output of said eleventh logic gate, said thirteenth logic gate providing a sum output.

9. The multiplication circuit of claim 1, wherein at least one of said compressor circuits comprises:

a first signal input, a second signal input, a third signal input, a fourth signal input, and a carry input;

a first logic gate consisting of a three-input OR gate feeding into one input of a two-input NAND gate, a second input of said NAND gate connected to said first signal input, said three inputs of said OR gate connected to said second, third and fourth signal inputs;

a second logic gate consisting of a two-input OR gate feeding into one input of a two-input NAND gate, a second input of said NAND gate connected to said second signal input, said two inputs of said OR gate connected to said third and fourth signal inputs;

a third logic gate consisting of a two-input NAND gate, said two inputs of said NAND gate connected to said third and fourth signal inputs;

a fourth logic gate consisting of a three-input NAND gate, said three inputs of said NAND gate connected to outputs of said first, second and third logic gates, said fourth logic gate providing a first carry output;

a fifth logic gate consisting of a four-input NAND gate, said four inputs of said NAND gate connected to said first, second, third and fourth signal inputs;

a sixth logic gate consisting of a two-input XOR gate, said two inputs of said XOR gate connected to said first and second signal inputs;

a seventh logic gate consisting of a two-input XOR gate, said two inputs of said XOR gate connected to said third and fourth signal inputs;

an eighth logic gate consisting of a two-input XNOR gate, said two inputs of said XNOR gate connected to outputs of said sixth and seventh logic gates;

an inverter connected to said carry input;

a ninth logic gate consisting of a two-input OR gate feeding into one input of a two-input NAND gate, a second input of said NAND gate connected to an output of said fifth logic gate, said two inputs of said OR gate connected to outputs of said eighth logic gate and said inverter, said ninth logic gate providing a second carry output; and a tenth logic gate consisting of a two-input XOR gate, said two inputs of said XOR gate connected to said outputs of said eighth logic gate and said inverter, said tenth logic gate providing a sum output.

10. The multiplication circuit of claim 1, wherein at least one of said compressor circuits comprises:

a first signal input, a second signal input, a third signal input, a fourth signal input, and a carry input;

a first logic gate consisting of a two-input NOR gate, said two inputs of said NOR gate connected to said first and second signal inputs;

a second logic gate consisting of a two-input NOR gate, said two inputs of said NOR gate connected to said third and fourth signal inputs;

a third logic gate consisting of a two-input NOR gate, said two inputs of said NOR gate connected to outputs of said first and second logic gates, said third logic gate providing a first carry output;

a fourth logic gate consisting of a two-input XNOR gate, said two inputs of said XNOR gate connected to said first and second signal inputs;

a fifth logic gate consisting of a two-input XNOR gate, said two inputs of said XNOR gate connected to said third and fourth signal inputs;

a sixth logic gate consisting of a three-input NAND gate, said three inputs of said NAND gate connected to said first and second signal inputs and an output of said fifth logic gate;

a seventh logic gate consisting of a three-input NAND gate, said three inputs of said NAND gate connected to said third and fourth signal inputs and an output of said fourth logic gate;

an eighth logic gate consisting of a two-input XNOR gate, said two inputs of said XNOR gate connected to said outputs of said fourth and fifth logic gates;

an inverter connected to said carry input;

a ninth logic gate consisting of a two-input OR gate feeding into one input of a three-input NAND gate, second and third inputs of said NAND gate connected to outputs of said sixth and seventh logic gates, said two inputs of said OR gate connected to outputs of said eighth logic gate and said inverter, said ninth logic gate providing a second carry output; and a tenth logic gate consisting of a two-input XOR gate, said two inputs of said XOR gate connected to said outputs of said eighth logic gate and said inverter, said tenth logic gate providing a sum output.

11. A multiplication circuit, comprising:

means, receiving an M-bit multiplicand and an N-bit multiplier, for forming partial product terms therefrom, each partial product term corresponding to a specified bit of an (M+N)-bit product; and, for each product bit, addition means for adding all partial product terms that correspond to that product bit plus any carry terms generated by the addition means for the next less significant product bit, each said addition means generating a sum forming said product bit and one or more carry terms to be transferred to the addition means for the next greater significant product bit, wherein each said addition means is organized into an asymmetric, non-inherently delay balanced architecture that is characterized by a plurality of adding stages forming partial sums, the adding stages being organized into a plurality of chains of successive subarray adders and a single chain of successive main array adders, a first stage in said chain of main array adders being an adder connected to two chains of subarray adders to receive partial sums therefrom, each stage of said chain of main array adders subsequent to said first stage being connected to a preceding stage of said main array adder chain and to one and only one chain of subarray adders, wherein each adding stage in said chain of main array adders being a four-to-two compression adder circuit, hereafter called a 'compressor', said two chains of subarray adders connected to said first stage of said main array being identical in the number of each type of adder in those chains, each chain of subarray adders connected to subsequent stages of said main array being identical to a chain of subarray adders connected to a preceding stage of said main array in the number of each type of adder in that chain except for having one more compressor than said preceding chain, whereby each signal propagation path through said chains of subarray adders and through said main array has a balanced delay, each compressor circuit having four signal inputs connected to outputs from a previous stage and an extra carry input connected to a carry output from a same stage of next lower bit significance, and also having sum and carry signal outputs connected to signal inputs of a subsequent stage and an extra carry output connected to a carry input for a same stage of next higher bit significance, wherein a state of said extra carry output is derived from states of all four of said signal inputs but not from said extra carry input and states of said sum and carry signal outputs are derived from all four of said signal inputs and said extra carry input, said extra carry input operating on a result of operation upon all four signal inputs to derive said sum and carry signal output states, said sum signal output having a state set to 1 if the number of 1's in said four signal inputs and said extra carry input is odd, said sum signal output being set to 0 otherwise, said carry signal output and said extra carry output being both set to 1 if the number of 1's in said four signal inputs and extra carry input is 4 or 5, one and only one of said carry signal output and said extra carry output being set to 1 if the number of 1's in said four signal inputs and extra carry input is 2 or 3, and said carry signal output and said extra carry output being both set to 0 if the number of 1's in said four signal inputs and extra carry input is 0 or 1;

wherein compressors in stages of said chain of subarray adders other than a first stage are asymmetric compressors in which two inputs to said compressors propagate slower than two other inputs to sum and carry outputs of said compressors, and subsequent to said addition means, a vector merging adder receiving a multibit sum word and a multibit carry word from the addition means for each product bit, said vector merging adder summing corresponding bits of the same bit significance of said sum word and said carry word to form said (M+N)-bit product.

12. The multiplication circuit of claim 11 further comprising a row of accumulator adders for at least each bit of said product.

13. The multiplication circuit of claim 12 wherein said accumulator adders are located between said addition means and said vector merging adder.

14. The multiplication circuit of claim 11 wherein said multiplicand and multiplier are in unsigned binary notation, said means for forming partial product terms generating M×N cross-products from said M bits of said multiplicand and said N bits of said multiplier.

15. The multiplication circuit of claim 11 wherein said multiplicand and multiplier are in two's-complement notation, said means for forming partial product terms generating said terms in accord with the Baugh-Wooley algorithm.

16. The multiplication circuit of claim 11 wherein said compressors in said main adder array and any compressors in a first stage of any chain of subarray adders are symmetric compressors in which four inputs to said compressors propagate essentially equal in speed to sum and carry outputs of said compressors.

17. A multiplication circuit, comprising:

means, receiving an M-bit multiplicand and an N-bit multiplier, for forming partial product terms therefrom, each partial product term corresponding to a specified bit of an (M+N)-bit product; and, for each product bit, addition means for adding all partial product terms that correspond to that product bit plus any carry terms generated by the addition means for the next less significant product bit, each said addition means generating a sum forming said product bit and one or more carry terms to be transferred to the addition means for the next greater significant product bit, wherein each said addition means is organized into an asymmetric, non-inherently delay-balanced architecture that is characterized by a plurality of adding stages forming partial sums, the adding stages being organized into a plurality of chains of successive subarray adders and a single chain of successive main array adders, a first stage in said chain of main array adders being an adder connected to two chains of subarray adders to receive partial sums therefrom, each stage of said chain of main array adders subsequent to said first stage being connected to a preceding stage of said main array adder chain and to one and only one chain of subarray adders, wherein each adding stage in said chain of main array adders being a four-to-two compression adder circuit, hereafter called a 'compressor', each compressor having a delay being less than a delay associated with a pair of successive full adders, said two chains of subarray adders connected to said first stage of said main array being identical in the number of each type of adder in those chains, each chain of subarray adders connected to subsequent stages of said main array being identical to a chain of subarray adders connected to a preceding stage of said main array in the number of each type of adder in that chain except for having one more compressor than said preceding chain, whereby each signal propagation path through said chains of subarray adders and through said main array has a balanced delay, each compressor circuit having four signal inputs connected to outputs from a previous stage and an extra carry input connected to a carry output from a same stage of next lower bit significance, and also having sum and carry signal outputs connected to signal inputs of a subsequent stage and an extra carry output connected to a carry input for a same stage of next higher bit significance, wherein a state of said extra carry output is derived from states of all four of said signal inputs but not from said extra carry input and states of said sum and carry signal outputs are derived from all four of said signal inputs and said extra carry input, said extra carry input operating on a result of operation upon all four signal inputs to derive said sum and carry signal output states, said sum signal output having a state set to 1 if the number of 1's in said four signal inputs and said extra carry input is odd, said sum signal output being set to 0 otherwise, said carry signal output and said extra carry output being both set to 1 if the number of 1's in said four signal inputs and extra carry input is 4 or 5, one and only one of said carry signal output and said extra carry output being set to 1 if the number of 1's in said four signal inputs and extra carry input is 2 or 3, and said carry signal output and said extra carry output being both set to 0 if the number of 1's in said four signal inputs and extra carry input is 0 or 1;

wherein compressors in stages of said chain of subarray adders other than a first stage are asymmetric compressors in which two inputs to said compressors propagate slower than two other inputs to sum and carry outputs of said compressors, and subsequent to said addition means, a vector merging adder receiving a multibit sum word and a multibit carry word from the addition means for each product bit, said vector merging adder summing corresponding bits of the same bit significance of said sum word and said carry word to form said (M+N)-bit product.

* * * * *